(12) United States Patent
Roudergues et al.

(10) Patent No.: US 8,327,723 B2
(45) Date of Patent: Dec. 11, 2012

(54) ON-BOARD DEVICE FOR A BICYCLE FOR MEASURING FORCES AND BICYCLE EQUIPPED WITH SUCH A MEASURING DEVICE

(75) Inventors: Frederic Roudergues, Nevers (FR); Julien Bouchez, Marseilles (FR)

(73) Assignee: Look Cycle International, Nevers (FR)

( * ) Notice: Subject to any disclaimer, the term of this patent is extended or adjusted under 35 U.S.C. 154(b) by 317 days.

(21) Appl. No.: 12/886,830

(22) Filed: Sep. 21, 2010

(65) Prior Publication Data

US 2011/0067503 A1    Mar. 24, 2011

(30) Foreign Application Priority Data

Sep. 22, 2009 (FR) ...................................... 09 56518

(51) Int. Cl.
*G01D 9/00* (2006.01)
(52) U.S. Cl. ........................................ 73/862.51; 73/760
(58) Field of Classification Search .................... 73/760, 73/862.49, 862.51, 862.541
See application file for complete search history.

(56) References Cited

U.S. PATENT DOCUMENTS

| | | | | |
|---|---|---|---|---|
| 5,308,300 | A * | 5/1994 | Chino et al. | 482/52 |
| 5,976,052 | A * | 11/1999 | Lenoble | 475/297 |
| 6,142,899 | A * | 11/2000 | Liu et al. | 474/80 |
| 6,920,955 | B2 * | 7/2005 | Chamberlin | 180/315 |
| 7,127,964 | B2 * | 10/2006 | Slanec | 74/514 |
| 7,470,847 | B2 * | 12/2008 | Kitagawa | 84/422.1 |
| 8,011,242 | B2 * | 9/2011 | O'Neill et al. | 73/379.01 |

FOREIGN PATENT DOCUMENTS

| | | |
|---|---|---|
| DE | 29507357 U1 | 7/1995 |
| DE | 29810641 U1 | 9/1998 |
| DE | 10007841 A1 | 9/2001 |
| EP | 1978342 A2 | 10/2008 |
| WO | 2008109914 A2 | 9/2008 |
| WO | 2009006673 A1 | 1/2009 |
| WO | 2010014242 A1 | 2/2010 |

OTHER PUBLICATIONS

International Search Report, dated Apr. 14, 2010, from corresponding French application.

* cited by examiner

*Primary Examiner* — Max Noori
(74) *Attorney, Agent, or Firm* — Young & Thompson

(57) ABSTRACT

The measuring device is intended to measure forces on a bicycle pedal (1) mounted to rotate on a pedal spindle (2) fixed at the free end of a crankset crankarm (6). The device includes force sensors positioned on the pedal spindle and able to detect the force directed perpendicularly to the pedal spindle and to supply a signal dependent on the force detected, and electronic elements able to process the signals received from the sensors. Some of the electronic elements are incorporated in an electronic card (23) powered by a stand-alone energy source and to which is fixed a male connecting member (24) able to pass through a fixing hole (5) of the pedal spindle (2) on the crankarm (6) in order to cooperate with a female connecting member provided in the end of the pedal spindle. The electronic card forms with the male connecting member an easily detachable assembly.

13 Claims, 4 Drawing Sheets

ON-BOARD DEVICE FOR A BICYCLE FOR MEASURING FORCES AND BICYCLE EQUIPPED WITH SUCH A MEASURING DEVICE

The present invention relates to an on-board device for a bicycle for measuring forces developed by a cyclist when pedaling. It also relates to a bicycle equipped with a measuring device according to the invention.

BACKGROUND OF THE INVENTION

A large number of different measuring devices are known that are intended to measure the force developed by a cyclist on a bicycle pedal. These devices use sensors of various types, such as the extensometers formed by strain gauges applied to elements of the bicycle such as the wheels, the crankarms of the crankset, the crankset spindle and the pedal spindles.

DESCRIPTION OF THE PRIOR ART

The applicant has also developed a dynamometric bicycle pedal described in the patent FR2878328. In this pedal, deformation gauges are used to measure the three components of the forces applied to the pedal, that is to say, longitudinal, transversal and vertical. However, this pedal is very complicated and ill suited to general public use. It is more suited to laboratory use.

There are also optical measuring means which measure the deformation differential between two sections equipped with a respective optical disk.

In all cases, the signals supplied by the sensors must then be transmitted to electronic signal processing means to be processed and converted into signals that can be used by a display device to show the detected force values.

The invention relates in particular to the devices in which force sensors are positioned on the pedal spindle. In this specific area, a measuring device of this kind is known, but it does not allow for use on a conventional crankset. More specifically, it is even necessary to change the crankarms, which are specific. It also concerns a device mounted on a stationary bicycle and the information is analyzed and displayed on a computer. The components are heavy and expensive and this device is used only for medical purposes.

Moreover, in many known devices, there is no dissociation of the two feet of the cyclist, nor is there any traction/propulsion ratio when pedaling.

In addition, the patent application WO 2010/014242, which benefits from a date prior to the priority date of the present application but which was published only after that date, describes an on-board measuring device of the kind described in the preamble to claim 1. However, this device is not suitable for being mounted and removed frequently on and from a crankset crankarm, and does not allow for easy use of the measuring device on different bicycles.

SUMMARY OF THE INVENTION

The aim of the invention is to remedy the drawbacks of the known measuring devices by proposing an on-board device for a bicycle for measuring forces which enables the cyclist to use his original crankset. The device according to the invention is simple, lightweight and can very easily be mounted and removed, and can also be used on different bicycles owned by the cyclist who will feel as if he is on his usual bicycle and riding with normal pedals.

The measuring device according to the invention also allows for a power measurement that differentiates the right and left feet.

The subject of the invention is an on-board measuring device for measuring forces developed by a cyclist on a bicycle pedal mounted to rotate on a pedal spindle fixed in a fixing hole at the free end of a crankset crankarm, comprising force sensors positioned on the pedal spindle and able to detect at least the force directed perpendicularly to the pedal spindle and to supply a signal dependent on the force detected, and electronic means receiving the signals from the sensors in order to obtain displayable values, at least some of said electronic means being incorporated in an electronic card powered by a stand-alone energy source and to which is fixed a male connecting member able to pass through said fixing hole for the pedal spindle on the crankarm in order to cooperate with a female connecting member provided in the end of the pedal spindle fixed to the crankarm, wherein said electronic card forms with said male connecting member an easily detachable assembly.

According to other features of the invention:
said male connecting member extends perpendicularly to said electronic card so that said electronic card extends parallel to the crankarm close to the latter when said male connecting member cooperates with said female connecting member;
said male connecting member is retained in said female connecting member by electrical contact means that are provided in said male and female connecting members and that can be mated with one another;
said force sensors are strain gauges and the angular position of the pedal spindle fixed to the crankarm can be adjusted and secured using a lock nut cooperating with a threading provided on the pedal spindle by bearing against the crankarm so that two opposite surfaces of the pedal spindle to which said strain gauges are fixed extend in a plane that substantially coincides with the longitudinal axis of the crankarm;
the relative angular position of said male and female connecting members is determined using a mistake-proofing device provided on the latter;
said mistake-proofing device comprises an axial groove provided on the internal face of said female connecting member and able to cooperate with an axial rib provided on the external face of said male connecting member, or vice versa;
two mistake-proofing devices are positioned diametrically opposite so as to allow a relative rotation of said male and female connecting members of 180°;
the device also comprises an angular speed sensor for the crankarm comprising a first part incorporated in the pedal body and a second part incorporated in the pedal spindle, said speed sensor being able to generate a signal dependent on the angular speed detected in order to supply it to said signal processing means;
said energy source is a battery incorporated in the electronic card;
said electronic card also comprises an emitter able to emit measurement data to a display device;
said display device is an on-board display device showing the cyclist in real time the forces developed; and
said electronic card also comprises a memory for storing data obtained from the signals emitted by the sensors.

The invention also relates to a bicycle equipped with a measuring device that has these features.

BRIEF DESCRIPTION OF THE DRAWINGS

Other features and advantages of the invention will emerge from the following description of a nonlimiting embodiment of the invention, with reference to the appended figures in which.

In the figures, identical or equivalent elements are given the same references.

DESCRIPTION OF THE PREFERRED EMBODIMENTS

Figure 1:
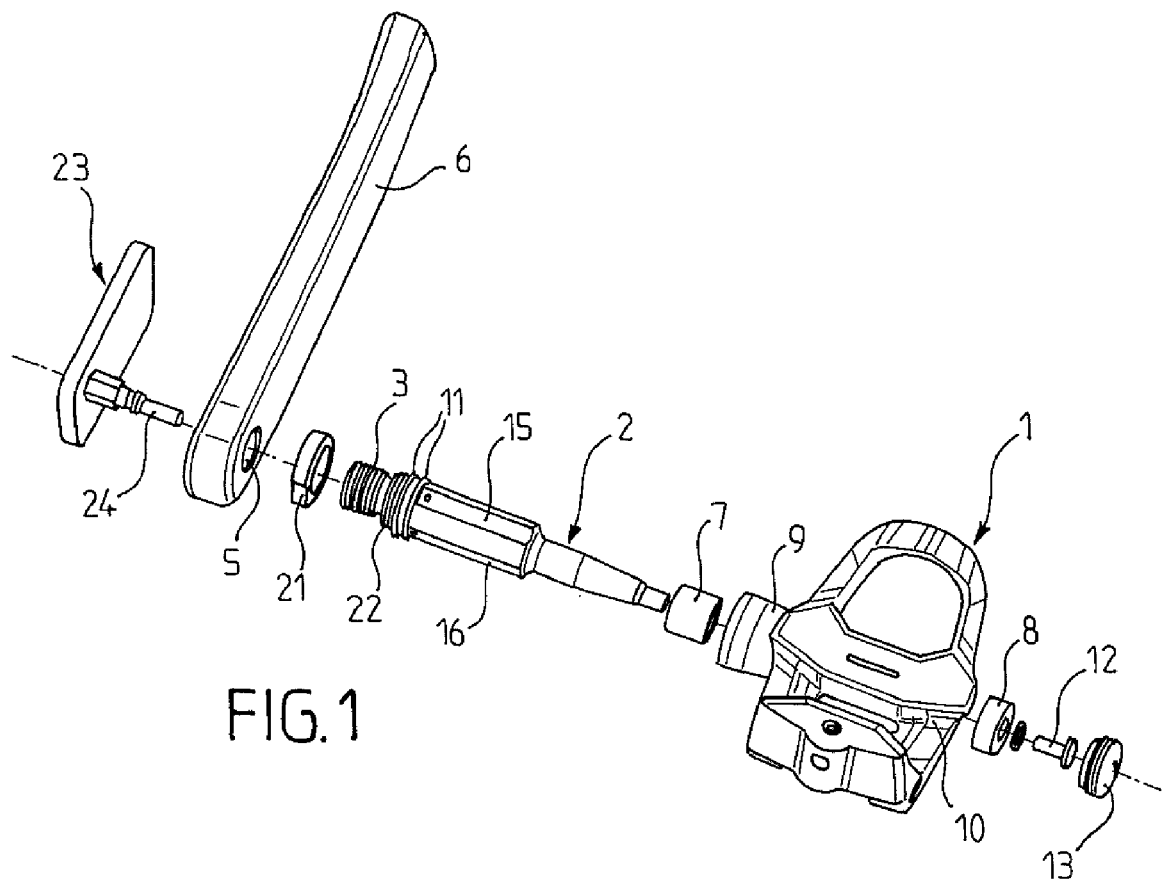
FIG. 1 is an exploded perspective view showing the parts of the device according to the invention before assembly.
Figure 2:
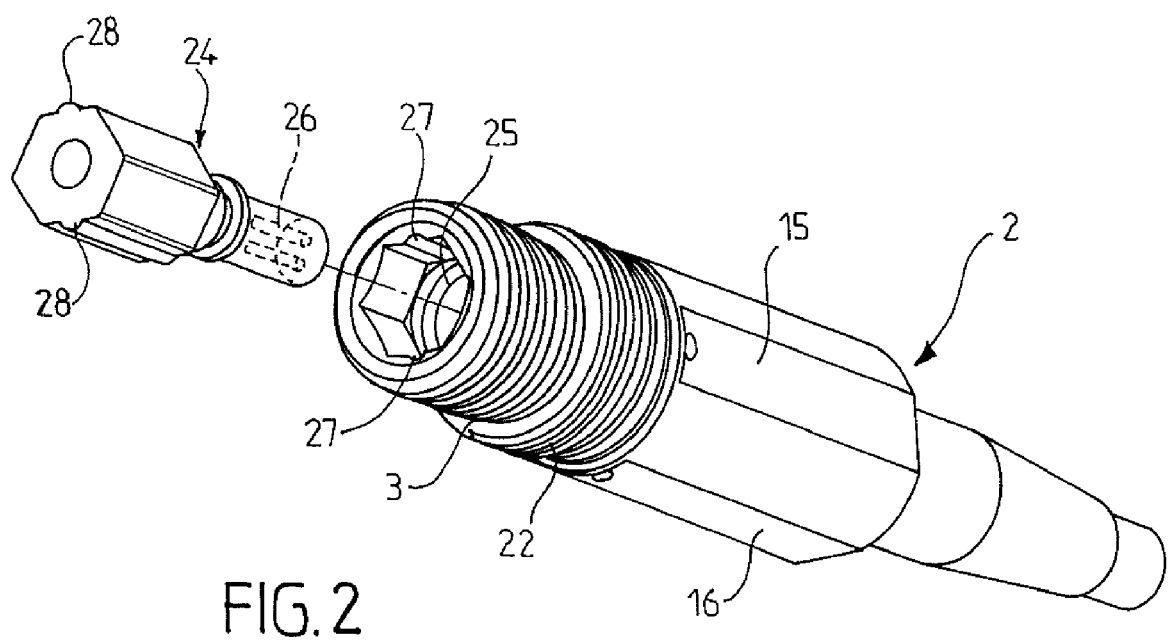
FIG. 2 is a perspective view showing the pedal spindle provided with a female connecting member, and a male connecting member that has to be received therein.
Figure 6:
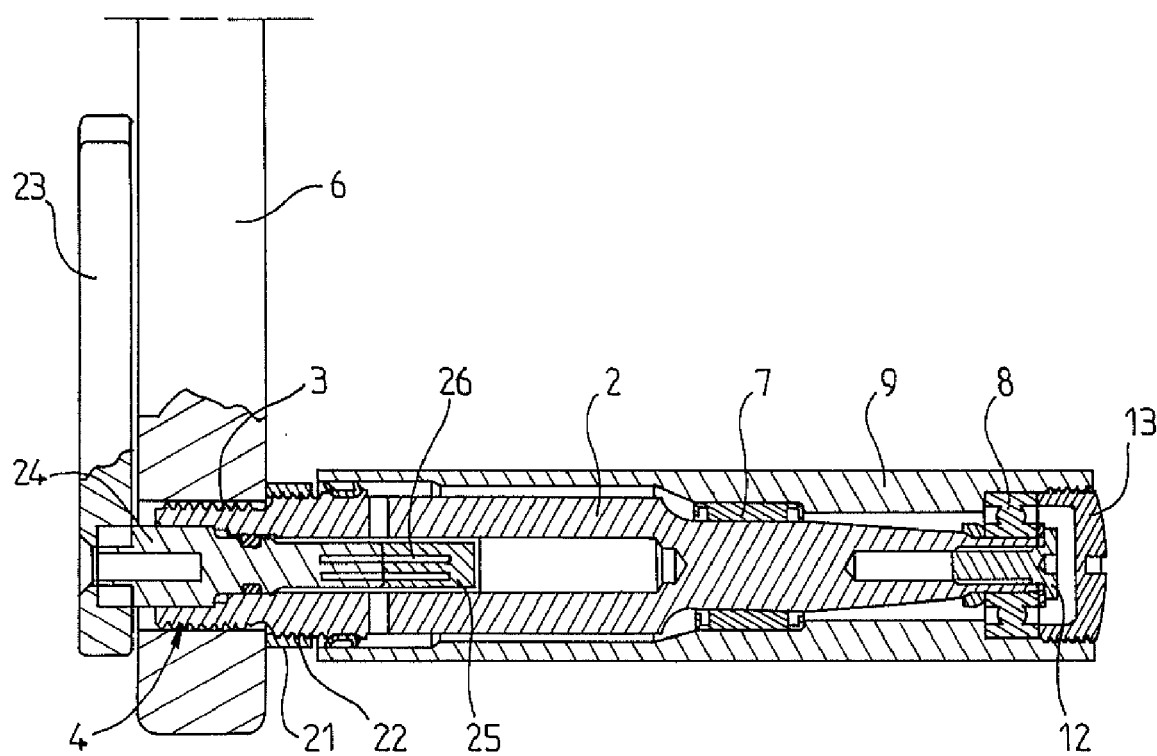
FIG. 6 is an axial cross-sectional view showing the part of the pedal body which is fixed to the pedal spindle which in turn is fixed to one side of the crankarm and the electronic card according to the invention to the other side of the latter.
Figure 7:
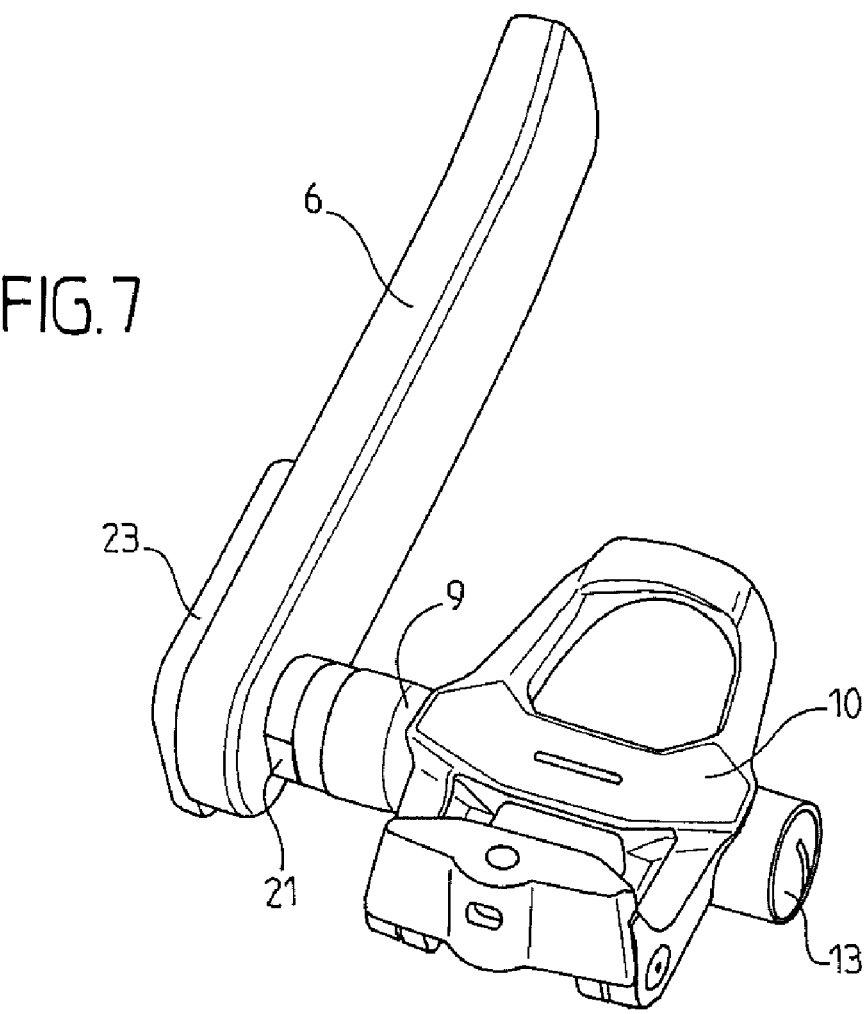
FIG. 7 is a perspective view illustrating the entire assembly according to the invention after assembly with the electronic card, and ready for use.

FIG. 1 shows a pedal 1 of the automatic kind which is well known in the state of the art and which will not be described in detail. The pedal 1 is intended to be mounted on a pedal spindle 2 which, at one of its ends, is provided with a threading 3 suitable for cooperating with a tapping 4 (see FIG. 6) provided through a fixing hole 5 at the free end of a crankset crankarm 6. The other crankarm is not shown in the figures, but it is identical to the one shown, although it extends in the opposite direction. Nor is the entire crankset shown since it does not relate to the invention.

The pedal 1 is conventionally mounted to rotate on the pedal spindle 2 using a needle roller bearing 7 and a rolling bearing 8 positioned between a hollow transversal part 9 of the pedal body 10 (see also FIG. 6) forming a recess intended to receive the pedal spindle 2.

Usually, sealing joints 11 are threaded onto the pedal spindle on the side of the crankarm 6 and finally, a screw 12 is screwed into a tapping provided at the corresponding end of the pedal spindle 2 to limit the longitudinal movement of the pedal 1 on the latter. A plug 13 is positioned outside the screw to seal the end of the hollow transversal part 9 of the pedal body 10.

Figure 3:
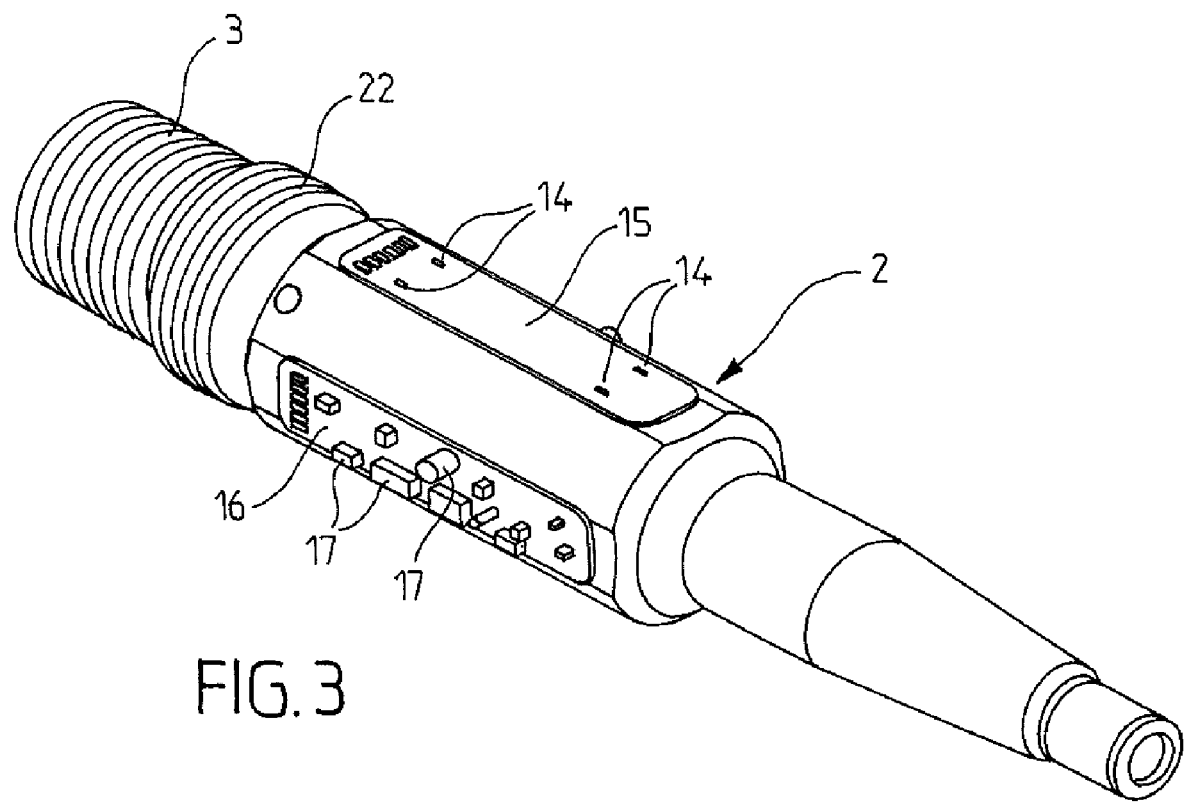
FIG. 3 is a perspective view of a pedal spindle illustrating the placement of the force sensors on the latter, and the placement of certain electronic means also placed on the pedal spindle.

Force sensors 14 (see FIG. 3), which in the example illustrated consist of strain gauges, are positioned on a flat surface 15 of the pedal spindle 2. The same number of force sensors 14 is positioned on a flat surface diametrically opposite (not represented) the flat surface 15.

Offset by 90° relative to the flat surface 15 there is another flat surface 16 which supports the electronic means 17 intended to perform a preliminary processing of the signals obtained from the sensors 14. Another flat surface (not represented) is positioned diametrically opposite the flat surface 16 and also supports electronic signal processing means.

Figure 4:
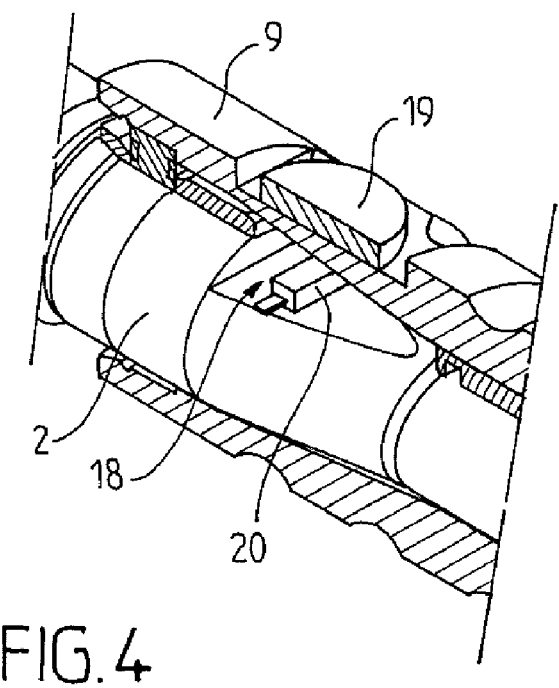
FIG. 4 is a partial perspective view illustrating the placement of the two parts of a crankarm angular speed sensor.
Figure 5:
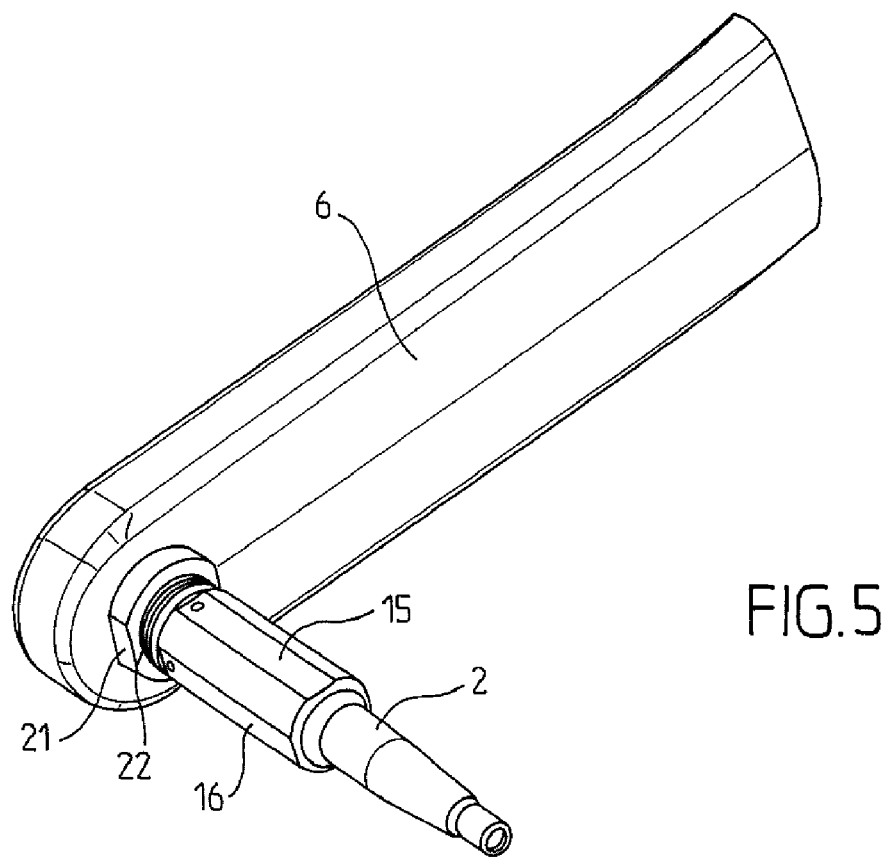
FIG. 5 is a perspective view showing the pedal spindle joined to the crankarm.

FIG. 4 shows an angular speed sensor 18 detecting the rotation of the crankarm 6. This angular speed sensor comprises a first part 19 incorporated in the hollow transversal part 9 of the pedal body and a second part 20 incorporated in the pedal spindle 2. The first part 19 consists of a magnet that rotates about the second part which constitutes the sensor proper, which is able to generate a signal dependent on the detected angular speed in order to supply it to said signal processing means 17.

The spindle provided with its sensors 14, 18 should have a well-defined position relative to the crankarm 6. To this end, the angular position of the pedal spindle 2 on the crankarm 6 may be adjusted and secured using a lock nut 21 that cooperates with a second threading 22 provided on the pedal spindle 2. This angular position can thus be adjusted so that the two opposite surfaces of the pedal spindle to which are fixed the force sensors 14 extend in a plane which substantially coincides with the longitudinal axis of the crankarm.

The measuring device according to the invention also comprises an electronic card 23 in which at least some of the electronic means of the device are incorporated. The electronic card 23 is powered by a stand-alone energy source (not represented) which, for example, consists of a battery (not represented), preferably rechargeable, incorporated in the card.

A male connecting member 24 is fixed to the electronic card 23 to pass through the fixing hole 5 for the pedal spindle 2 on the crankarm 6 in order to cooperate with a female connecting member 25 provided in the end of the pedal spindle 2 fixed to the crankarm 6. Electrical contact means 26 are provided in the male and female connecting members 24, 25 to provide the link between the electronic card and the rest of the electrical circuit comprising the electronic means for preprocessing the signals supplied by the sensors 14, 18.

The male connecting member 24 extends perpendicularly to the electronic card 23 so that the latter extends parallel to the crankarm 6 close to the latter when the male connecting member cooperates with the female connecting member 25.

Obviously, the electronic card could be directly linked to the sensors and contain all the electronic means necessary for processing the signals supplied by the sensors 14, 18.

Moreover, the electrical contact means 26 can be mated with one another to retain the male connecting member 24 in the female connecting member 25. Since there is practically no force acting longitudinally to separate the two connecting members 24, 25, no snap fitting or screw fixing is necessary.

The electronic card 23 thus forms with the male connecting member 24 an assembly that can easily be mounted and removed by a simple traction, without aid of any tool, for example to be mounted on another bicycle, or else to protect the card when it is not being used or else to recharge the battery of the card.

In a technical equivalence not illustrated in the drawings, a reverse arrangement of the male and female connecting members is implemented, which means that the male connecting member forms an extension of the pedal spindle to extend through the fixing hole 5 of the crankarm 6 to cooperate with a female connecting member in the electronic card 23.

The relative angular position of the male and female connecting members 24, 25 is determined using a mistake-proofing device provided on the latter. This mistake-proofing device comprises an axial groove 27 provided on the internal face of the female connecting member 25 and able to cooperate with an axial rib 28 provided on the external face of the male connecting member, or vice versa.

In the example illustrated, two mistake-proofing devices 27, 28 are positioned diametrically opposite so as to allow a relative displacement of said male and female connecting members of 180°.

Also in the example illustrated, the end of the male connecting member 24 fixed to the electronic card 21 is hexagonal in order to be received in the hollow at the end of the pedal spindle 2 which has a complementary hexagonal form.

The electronic card 23 advantageously also comprises an emitter (not represented) able to emit measurement data to a display device (not represented).

Preferably, the display device is an on-board display device enabling the cyclist to be informed in real time of the forces that he develops when pedaling.

Finally, the electronic card may also comprise a memory (not represented) for storing data obtained from the signals emitted by the sensors 14, 18.

Figure 8:
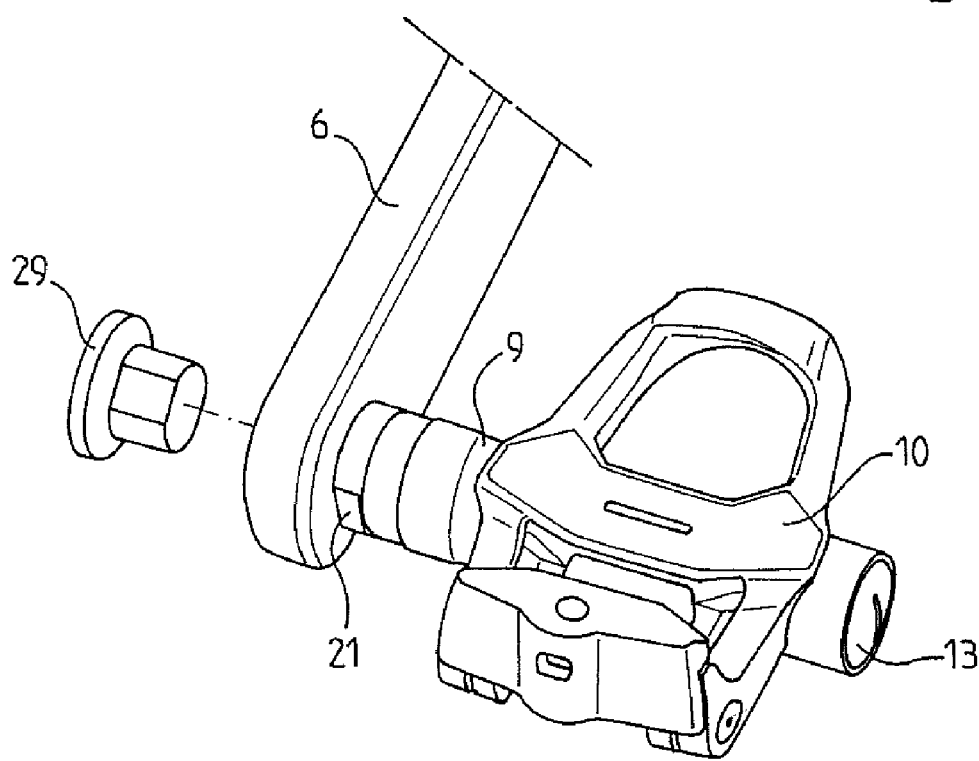
FIG. 8 is a perspective view similar to that of FIG. 7, but without the electronic card and with a plug in its place.

When the electronic card/male connecting member assembly is removed temporarily, for example in order to wash the bicycle or to protect it when it is not being used, the hole formed by the female connecting member 25 is advantageously sealed by a plug 29 suited to the internal form of this member as is shown in FIG. 8.

The device according to the invention also offers the advantage that the detection and analysis of the forces directed toward the two pedals are entirely dissociated, as is the distribution of the traction-propulsion forces.

Obviously, the invention is not limited to the example illustrated and described, but may be the subject of many variants within the scope of those skilled in the art without in any way departing from the framework of the invention.

The invention claimed is:

1. An on-board measuring device for measuring forces developed by a cyclist on a bicycle pedal mounted to rotate on a pedal spindle fixed in a fixing hole at the free end of a crankset crankarm comprising force sensors positioned on the pedal spindle and able to detect at least the force directed perpendicularly to the pedal spindle and to supply a signal dependent on the force detected, and electronic means receiving the signals from the sensors in order to obtain displayable values, at least some of said electronic means being incorporated in an electronic card powered by a stand-alone energy source and to which is fixed a male connecting member able to pass through said fixing hole for the pedal spindle on the crankarm in order to cooperate with a female connecting member provided in the end of the pedal spindle fixed to the crankarm, wherein said electronic card forms with said male connecting member an easily detachable assembly.

2. The force measuring device as claimed in claim 1, wherein said male connecting member extends perpendicularly to said electronic card so that said electronic card extends parallel to the crankarm close to the latter when said male connecting member cooperates with said female connecting member.

3. The force measuring device as claimed in claim 2, wherein said male connecting member is retained in said female connecting member by electrical contact means that are provided in said male and female connecting members and that can be mated with one another.

4. The force measuring device as claimed in claim 1 and in which said force sensors are strain gauges, wherein the angular position of the pedal spindle fixed to the crankarm can be adjusted and secured using a lock nut cooperating with a threading provided on the pedal spindle by bearing against the crankarm so that two opposite surfaces of the pedal spindle to which said strain gauges are fixed extend in a plane that substantially coincides with the longitudinal axis of the crankarm.

5. The force measuring device as claimed in claim 1, wherein the relative angular position of said male and female connecting members is determined using a mistake-proofing device provided on the latter.

6. The force measuring device as claimed in claim 5, wherein said mistake-proofing device comprises an axial groove provided on the internal face of said female connecting member and able to cooperate with an axial rib provided on the external face of said male connecting member, or vice versa.

7. The force measuring device as claimed in claim 6, wherein two mistake-proofing devices are positioned diametrically opposite so as to allow a relative rotation of said male and female connecting members of 180°.

8. The force measuring device as claimed in claim 1, which also comprises an angular speed sensor for the crankarm comprising a first part incorporated in the pedal body and a second part incorporated in the pedal spindle, said speed sensor being able to generate a signal dependent on the angular speed detected in order to supply it to said signal processing means.

9. The force measuring device as claimed in claim 1, wherein said energy source is a battery incorporated in the electronic card.

10. The force measuring device as claimed in claim 1, wherein said electronic card also comprises an emitter able to emit measurement data to a display device.

11. The force measuring device as claimed in claim 10, wherein said display device is an on-board display device showing the cyclist in real time the forces developed.

12. The force measuring device as claimed in claim 1, wherein said electronic card also comprises a memory for storing data obtained from the signals emitted by the sensors.

13. Bicycle equipped with a measuring device as claimed in claim 1.

* * * * *